United States Patent
de Ville et al.

(10) Patent No.: US 9,317,594 B2
(45) Date of Patent: Apr. 19, 2016

(54) SOCIAL COMMUNITY IDENTIFICATION FOR AUTOMATIC DOCUMENT CLASSIFICATION

(71) Applicant: SAS Institute Inc., Cary, NC (US)

(72) Inventors: Barry de Ville, Holly Springs, NC (US); Gurpreet Bawa, Chandigarh (IN)

(73) Assignee: SAS Institute Inc., Cary, NC (US)

( * ) Notice: Subject to any disclaimer, the term of this patent is extended or adjusted under 35 U.S.C. 154(b) by 410 days.

(21) Appl. No.: 13/727,951

(22) Filed: Dec. 27, 2012

(65) Prior Publication Data

US 2014/0188830 A1    Jul. 3, 2014

(51) Int. Cl.
*G06F 17/30*    (2006.01)

(52) U.S. Cl.
CPC .................. *G06F 17/3071* (2013.01)

(58) Field of Classification Search
None
See application file for complete search history.

(56) References Cited

U.S. PATENT DOCUMENTS

| | | | |
|---|---|---|---|
| 6,510,406 B1 * | 1/2003 | Marchisio | 704/9 |
| 7,065,532 B2 * | 6/2006 | Elder et al. | |
| 2003/0158850 A1 * | 8/2003 | Lawrence et al. | 707/100 |
| 2009/0048927 A1 * | 2/2009 | Gross | 705/14 |
| 2010/0125502 A1 * | 5/2010 | Solomon et al. | 705/14.52 |
| 2014/0095504 A1 * | 4/2014 | Soroushian | 707/737 |
| 2014/0122479 A1 * | 5/2014 | Panferov et al. | 707/736 |

OTHER PUBLICATIONS

Blei et al., "Latent Dirichlet Allocation", Journal of Machine Learning Research 3 (2003), pp. 993-1022.
de Ville et al., "Topic Discovery, Tracking, and Characterization of Social Media Conversation for Point of Origin and Dissemination Discovery: Structural Precursors to Topic Determination in Text Corpora", SAS Global Forum 2012, Paper 302-2012, 12 pages.
Leskovec et al., "Meme-tracking and the Dynamics of the News Cycle", KDD 09, Jun. 28-Jul. 1, 2009, Paris France, 9 pages.
SAS Text Miner 4.2, "Capitalize on the Value Hidden in Textual Information", SAS institute Inc., Fact Sheet 2010, 4 pages.

* cited by examiner

*Primary Examiner* — Bai D. Vu
(74) *Attorney, Agent, or Firm* — Bell & Manning, LLC

(57) ABSTRACT

Systems and methods for identifying data files that have a common characteristic are provided. A plurality of data files are received. The plurality of data files include one or more data files having the common characteristic. A list of key terms is generated from the plurality of data files. Data files from the plurality of data files that have an association with a social community are identified, where the social community is defined by one or more features. The list of key terms is updated based on an analysis of the identified features. The updated list of key terms is used to identify other data files that have the common characteristic.

41 Claims, 11 Drawing Sheets

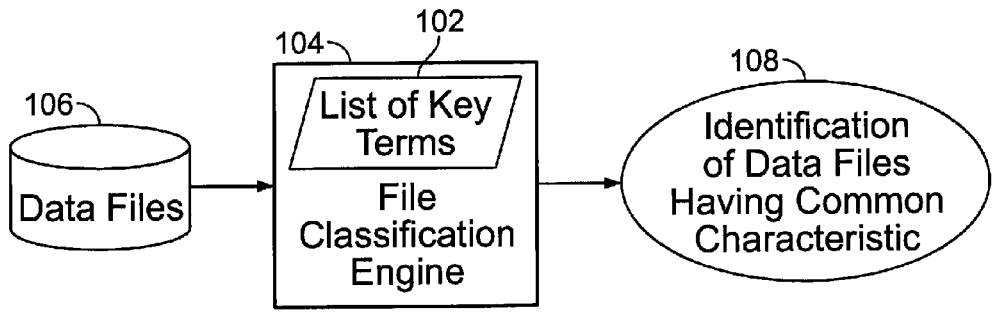
FIG. 1A
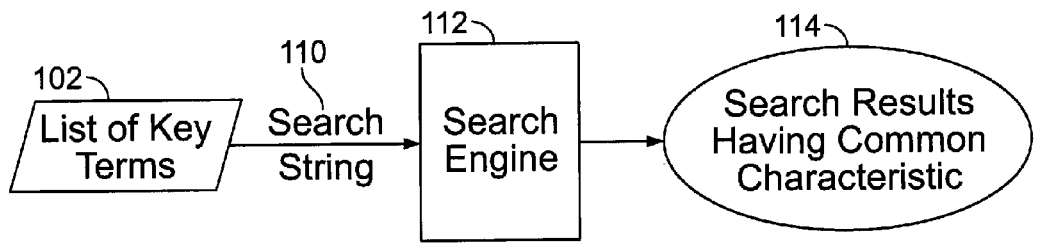
FIG. 1B
| Role | Term | Weight | Topic |
|---|---|---|---|
| Noun | cpu | 1.708 | 3d hd,120hz, hd, +screen |
| Noun | 120hz | 1.761 | 3d hd,120hz, hd, +screen |
| Prop | hd | 1.761 | 3d hd,120hz, hd, +screen |
| Verb | Refresh | 1.699 | 3d hd,120hz, hd, +screen |
| Prop | Brilliance | 1.501 | 3d hd,120hz, hd, +screen |
FIG. 2

| All Terms | Category? | 1 | 2 | 3 |
|---|---|---|---|---|
| Laptop | Yes | Gaming, High-end, Game Laptop | | |
| Gaming | No | | | |
| 3d hd | No | | | |
| 120 hz | No | | 120 hz, Desktop, Heavy-duty | |
| Screens | Yes | | | |
| Refresh | No | | | Refresh, Rate, Game |

FIG. 5

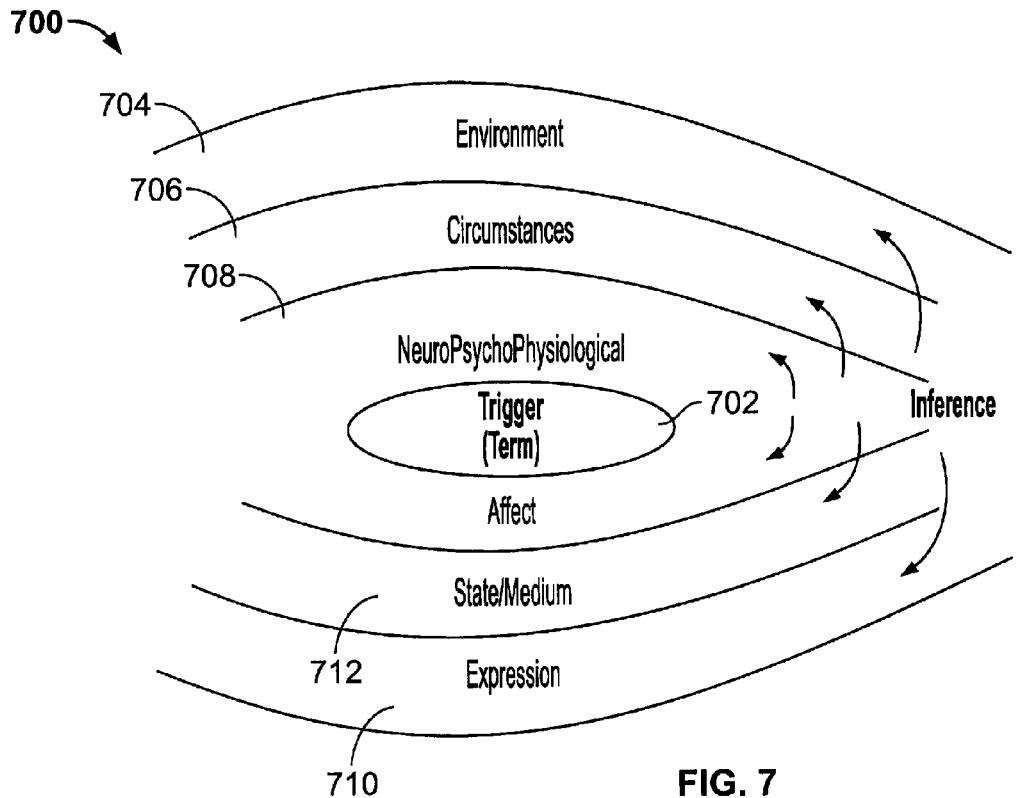

FIG. 7

| Sub Net ID | Precondition | Outcome |
|---|---|---|
| 1 | Gender is Male and Community is Friends | Then TextTopic_1 = 0.00 |
| 2 | Gender is Male and Community is Others and Mood is Positive | Then TextTopic_1 = 0.00 |
| 3 | Gender is Male and Community is Others and Mood is Very Positive or Negative | Then TextTopic_1 = 0.97 |
| 4 | Gender is Female and CommunitySize is Metro | Then TextTopic_1 = 0.03 |
| 5 | Gender is Female and CommunitySize is Small, Medium and Frequency is Low, Medium | Then TextTopic_1 = 100 |
| 6 | Gender is Female and CommunitySize is Small, Medium and Frequency is High | Then TextTopic_1 = 0.34 |

FIG. 8

SOCIAL COMMUNITY IDENTIFICATION FOR AUTOMATIC DOCUMENT CLASSIFICATION

TECHNICAL FIELD

The technology described in this document relates generally to computer-implemented methods for classifying data files, and more particularly to systems and methods for identifying data files that have a common characteristic based on social community associations of a plurality of input data files.

BACKGROUND

The popularity of the Internet and the availability of nearly-unlimited data storage capacity have caused large amounts of data to be generated. Within the vast amounts of data, much valuable knowledge and information may be available if it can be located, for example, by computer-implemented file classification techniques used to categorize unknown data files.

SUMMARY

The present disclosure is directed to systems and methods for identifying data files that have a common characteristic. In a method for identifying data files that have a common characteristic, a plurality of data files are received. The plurality of data files include one or more data files having the common characteristic. A list of key terms is generated from the plurality of data files. Data files from the plurality of data files that have an association with a social community are identified, where the social community is defined by one or more features. The list of key terms is updated based on an analysis of the identified features. The updated list of key terms is used to identify other data files that have the common characteristic.

The method may further include classifying a data file of the plurality of data files within a hierarchical structure, where the hierarchical structure includes upper nodes and lower nodes configured to group data files having similar characteristics. The identified data files having the association with the social community may be classified within a particular node of the hierarchical structure that is defined by the one or more features. The upper nodes may group the data files based on general similarities, and the lower nodes may group the data files based on specific similarities. A decision tree may be used to classify the data files within the hierarchical structure, where the decision tree may employ a criterion sensitive to a presence or an absence of the key terms in the plurality of data files. Data files grouped within the lower nodes may have a greater number of similarities than data files grouped within the upper nodes.

The method may further include building a network including one or more of the plurality of data files, where connections between the data files of the network may be encoded as links or edges. The data files may be classified within the hierarchical structure by analyzing the network. The links or edges may be top-down directional links or edges.

Data files may be classified within an upper node of the hierarchical structure based on a physical connection between the classified data files or based on a semantic connection between the classified data files. The physical connection may indicate a message exchange between the classified data files, and the semantic connection may indicate shared semantic content in the classified data files. In classifying the data files within the upper node based on the physical connection, the classified data files may be linked together by a thread. The thread may be defined by email header fields, a common thread field in a database, a common topic on a discussion forum, or a common social media message. In classifying the data files within the upper node based on the semantic connection, the classified data files may originate from a common geographical location, be associated with a common period of time, or be associated by a shared semantic similarity based on patterns of nouns, verbs, other words, or parts of speech.

A data file may be classified within a lower node of the hierarchical structure based on a social organization characteristic of the classified data file, an individual descriptive characteristic of the classified data file, a psychological characteristic of the classified data file, or an operational characteristic of the classified data file. The social organization characteristic may indicate a social position associated with a creator of the classified data file. The individual descriptive characteristic may indicate a personal characteristic of the creator of the classified data file. The psychological characteristic may indicate a psychological state of the creator of the classified data file. The operational characteristic may indicate characteristics of message exchange associated with the classified data file. The data file may be classified within the lower node of the hierarchical structure by classifying the data file based on the individual descriptive characteristic first, classifying the data file based on the social organization characteristic second, and classifying the data file based on the operational characteristic third.

The individual descriptive characteristic may include age, gender, education, marital status, interests, affiliations, or memberships of the creator of the classified data file. The psychological characteristic may be a mood state of the creator of the classified data file or an introversion or extroversion score of the creator of the classified data file. The social organization characteristic may be a geographical location associated with the classified data file; a time associated with the classified data file; a social role associated with the classified data file; an indication of whether the creator of the classified data file has a leader status, a follower status, or a marginal status; a social influence associated with the classified data file; a community size associated with the classified data file; a community density associated with the classified data file; a dispersion of a community associated with the classified data file; or a community character associated with the classified data file. The operational characteristic may be a message recency of the classified data file, a frequency of message exchange over a given time period between the data files classified within the lower node, a message mood state, a conversation acceleration rate of the data files classified within the lower node, or a characterization of the message exchange between the data files classified within the lower node as being personal or professional.

The method may further include analyzing the data files having the association with the social community. The analyzing may include extracting features from the data files having the association with the social community. The extracted features may be words, phrases, sentences, or symbols. The analyzing may also include computing a combination or a permutation of one or more of the extracted features. The combination or the permutation may include a synonym, a collocation, a sequential collocation, a bigram, a noun phrase, a named entity, a part of speech, or a raw term. The combination or the permutation may be a hypernym. The analyzing may further include updating the list of key terms based on the extracted features and the combination or the permutation.

The method may further include identifying the data files having the association with the social community, where the social community may be defined by the one or more features, and the one or more features may define a homogenous subgroup of a population from which changes in vocabulary used to describe the common characteristic develop. The identified data files may be created by members of the social community, and a social context of the social community may influence a meaning of vocabulary in the identified data files. The plurality of data files may include one or more data files that do not have the common characteristic. The common characteristic may be a category, classification, or topic.

The plurality of data files may be text documents, and the key terms may be words, phrases, sentences, or symbols that are associated with the common characteristic. The method may further include using the updated list of key terms to categorize text or to generate search strings for a search engine. The text to be categorized may be from a social media source. A human or a computer may be used to determine the common characteristic of the one or more data files having the common characteristic and the key terms of the list of key terms. The list of key terms may be a topic definition, and the key terms of the topic definition may be associated with the common characteristic.

In another embodiment, a system for identifying data files that have a common characteristic includes one or more processors and one or more non-transitory computer-readable storage mediums containing instructions. The instructions are configured to cause the one or more processors to perform operations including receiving a plurality of data files, where the plurality of data files include one or more data files having the common characteristic. A list of key term is generated from the plurality of data files. Data files from the plurality of data files having an association with a social community are identified, where the social community is defined by one or more features. The list of key terms is updated based on an analysis of the identified data files. The updated list of key terms is used to identify other data files that have the common characteristic.

In yet another embodiment, a non-transitory computer program product for identifying data files that have a common characteristic is tangibly embodied in a machine-readable non-transitory storage medium. The non-transitory computer program product includes instructions configured to cause a data processing system to perform operations including receiving a plurality of data files, where the plurality of data files include one or more data files having a common characteristic. A list of key term is generated from the plurality of data files. Data files from the plurality of data files having an association with a social community are identified, where the social community is defined by one or more features. The list of key terms is updated based on an analysis of the identified data files. The updated list of key terms is used to identify other data files that have the common characteristic.

In another embodiment, a system for generating a list of key terms from a plurality of data files includes a key term generation engine. The key term generation engine receives the plurality of data files including one or more data files having a common characteristic. The common characteristic is a subject matter or topic. A list of key terms is generated from the plurality of data files in the key term generation engine. The key term generation engine classifies each data file of the plurality of data files within a hierarchical structure, where the hierarchical structure includes nodes configured to group data files having similar features. The key term generation engine identifies a group of data files having an association with a particular node of the hierarchical structure, where the particular node is associated with a social community. The key term generation engine extracts features from the group of data files, where the features include words related to the common characteristic. The list of key terms is updated based on the extracted features. The plurality of data files may further include one or more data files not having the common characteristic. The list of key terms generated from the plurality of data files may include a ranking or weighting value associated with each term of the list.

In another embodiment, a system for generating a list of key terms from a plurality of data files includes a key term generation engine. The key term generation engine receives the plurality of data files from a text corpus and calculates categories or topics from the plurality of data files. The list of key terms is extracted from the plurality of data files based on the calculated categories or topics. The key term generation engine classifies the plurality of data files within a hierarchical structure, where the hierarchical structure includes nodes configured to group data files having similar features. A group of data files having an association with a particular node of the hierarchical structure is identified by the key term generation engine. The key term generation engine extracts features from the group of data files, where the features include words related to one or more of the calculated categories or topics. Combinations or permutations of the extracted features are computed by the key term generation engine. The key term generation engine uses the extracted features and the combinations or permutations to update the list of key terms.

BRIEF DESCRIPTION OF THE FIGURES

FIGS. 1A and 1B depict example applications of a list of key terms generated via a system or method for identifying data files that have a common characteristic.

FIG. 2 depicts an example list of key terms used as part of a computer-implemented file classification engine.

FIG. 5 illustrates an example of category and topic calculation used in generating an initial list of key terms from a plurality of input data files.

FIG. 7 depicts aspects of an example process from which textual expression emerges in human beings.

FIG. 8 depicts an example social community predictor table.

DETAILED DESCRIPTION

Figure 3:
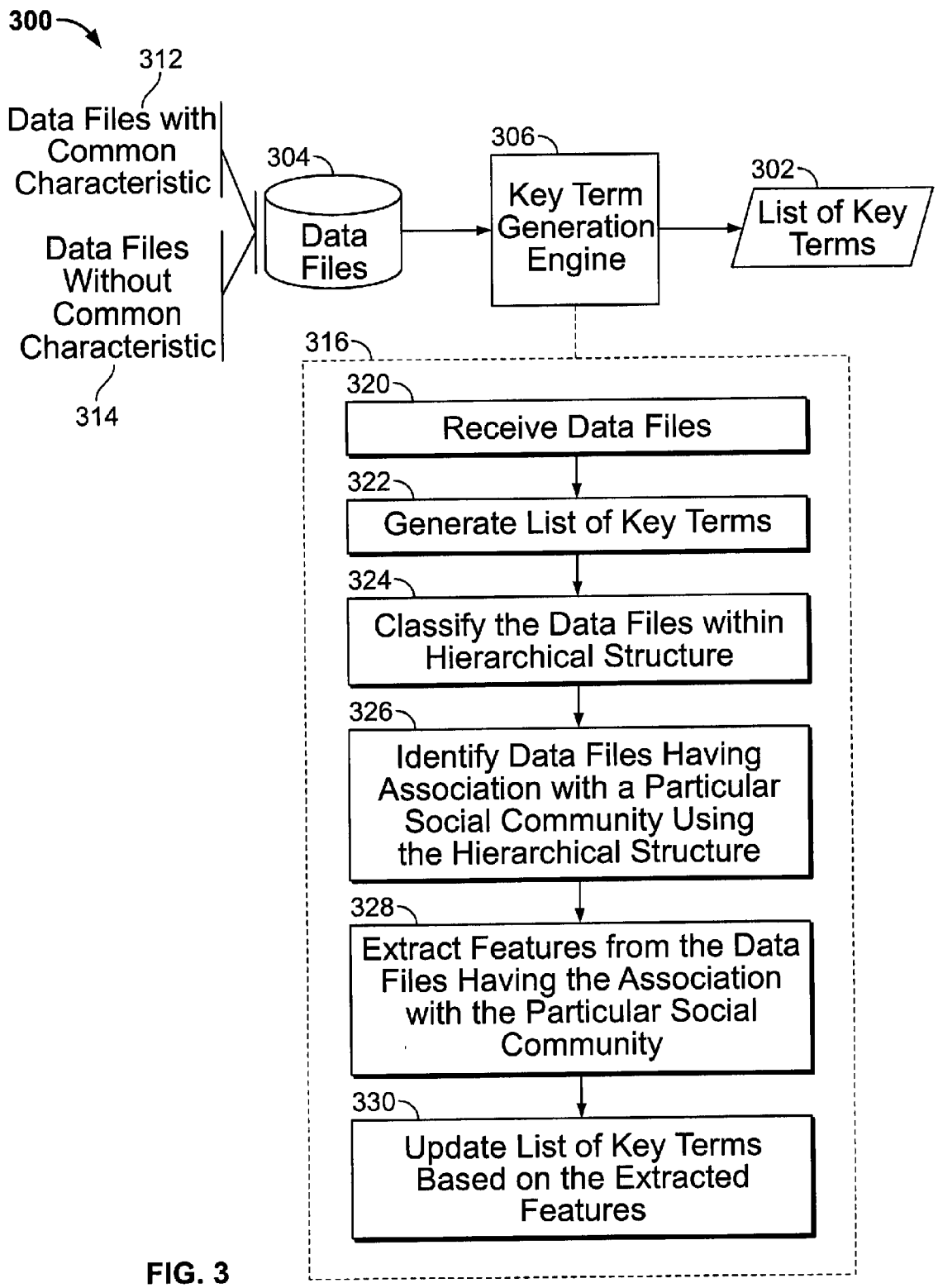
FIG. 3 is a block diagram of an example system for generating a list of key terms from a plurality of data files.

FIGS. 1A and 1B depict example applications of a list of key terms 102 generated via a system or method for identifying data files that have a common characteristic. In FIG. 1A, the list of key terms 102 is used as a component of a computer-implemented file classification engine 104. The computer-implemented file classification engine 104 may be used to automatically classify data files 106 as being associated with one or more different categories, classifications, or topics. Multiple data files classified under a particular category, classification, or topic may thus have a common characteristic (i.e., a common subject matter). The list of key terms 102 used as part of the file classification engine 104 includes one or more key terms configured to identify features of the data files 106 that are relevant to or typical of data files having the common characteristic. For example, a list of key terms 102 directed to the topic of "winter" may include terms such as "snow," "ice," and "cold," such that data files including one or more of these key terms may be classified by the file classification engine 104 as being relevant to the topic.

The file classification engine 104 receives as inputs the unknown, unclassified data files 106 (e.g., webpages, social media content and conversations, blog posts, content from Internet message boards, reports containing financial data, medical histories, reports containing genetic data for an individual, articles, book chapters). As output, the classification engine 104 generates one or more binary classifications for the input data files 106. The binary classifications are used to produce an output identifying which data files of the unknown, unlabeled data files 106 have the common characteristic 108. For example, a file classification engine related to the topic "snow" may receive as inputs random, unlabeled social media conversations related to a variety of topics. For each message within the conversations, the classification engine may produce an output indicating whether the message relates to the topic of "snow" (i.e., the common characteristic for all files classified as such). The file classification engine related to snow may also be capable of producing more specific binary classifications (i.e., whether snow is being discussed in terms of weather systems or whether snow is being discussed in terms of winter sports). Using such a computer-implemented file classification engine, relevant messages from the social media conversations can be located automatically, without a need for human intervention or requiring only minimal human intervention. As described in detail below, because new vocabulary and modes of expression used to describe "snow" may emerge, there is a need to update the list of key terms 102 over time.

FIG. 1B depicts use of the list of key terms 102 to generate a search string 110 to be input into a search engine 112. The list of key terms 102 may include a plurality of key terms, and particular key terms from the list 102 may be extracted and used in the search string 110. Using the search string 110, the search engine 112 returns search results that possess a common characteristic 114. In one example, the search engine 112 is used to return search results 114 that include blog posts, social media conversations, and content from Internet message boards that are directed to a particular topic. Use of the list of key terms 102 in this manner may be an efficient method of locating relevant content on the Internet because the search string 110 based on the list of key terms 102 identifies key features that have previously been shown to be relevant to the common characteristic.

The lists of key terms 102 may be generated by receiving a plurality of data files (e.g., a text corpus), generating an initial list of key terms from the plurality of data files that have the common characteristic, and updating the initial list of key terms based on an analysis of the data files that focuses on social community associations of the data files. In one example, each of the data files of the plurality of data files is characterized as being associated with one or more social communities. In this example, the data files are analyzed based on their associations with the one or more social communities because it is expected that variations in vocabulary and modes of expression (i.e., memetic variants) used to describe the common characteristic will develop within conversations taking place within the social communities. By analyzing the data files in this manner, based on their social community associations, the variations in the vocabulary and modes of expression can be recognized and used in identifying other data files that have the common characteristic.

An example may be used to illustrate the role of social communities in this type of analysis. In the example, a corpus of text documents is retrieved from the Internet. The corpus of text documents may include social media conversations, blog posts, or messages from Internet discussion forums. An initial list of key terms is extracted from the corpus of text documents, where the key terms of the list are associated with or representative of a common topic, "snow." The initial list of key terms may be extracted using any appropriate technique (e.g., a manual technique where a person reviews the text documents and identifies words or symbols that are representative of the common topic, or an automatic, computer-implemented category or topic derivation technique). After extraction of the initial list of key terms, the text documents of the corpus are each identified as being associated with one or more social communities. In the example, the text documents may be identified as being associated with social communities that include "expert snowboarders" and "beginning skiers." The identification of the social community associations is used in subsequent operations to perform further analysis on the text documents in order to update (i.e., expand) the initial list of key terms. The updating of the initial list of key terms is intended to increase the ability of the list to accurately identify text documents related to the common topic of "snow."

To update the initial list of key terms, the text documents identified as being associated with a social community are grouped together and analyzed as a group. By grouping the text documents associated with the social community and analyzing the documents as a group, new vocabulary words and modes of expression used to describe "snow" may be identified. The new vocabulary words and modes of expression may be used to update the initial list of key terms. For example, by analyzing text documents associated with the "expert snowboarders" social community, it may be determined that expert snowboarders commonly refer to snow as "sugar." Similarly, by analyzing text documents associated with the "beginning skiers" social community, it may be determined that beginning skiers commonly refer to snow as "powder." The terms "sugar" and "powder" are added to the initial list of key terms. Had the documents associated with the "expert snowboarders" and "beginning skiers" social communities not been grouped together and analyzed as groups, the significance of the terms "sugar" and "powder" to the common topic of "snow" may not have been identified (i.e., if the documents were analyzed within the context of the entire text corpus, these terms may not have been determined to be significant to the topic of "snow"). Thereafter, the updated list of key terms may be used to identify other text documents that relate to the topic "snow" (e.g., using the file classification engine 104 or the search engine 112 of FIGS. 1A and 1B, respectively).

As illustrated above for the "snow" example, new vocabulary words and modes of expression relating to a given topic may be identified by placing data files within the context of a social network. In such a system, the information reflected in the data files may be viewed as a "conversation," where the conversation takes place among members of a particular social community. The particular social community has specific characteristics or features that define the community and the associated behavioral attributes of the conversation that takes place among the community members. For example, the "expert snowboarders" and "beginning skiers" labels define the communities and the behavioral attributes of the conversations that take place within the communities in the example above. However, in other examples, more complex definitional characteristics may be identified using a variety of social, analytical, semantic, participant, and conversation identification techniques. For example, communities may be defined based on a plurality of variables, where example variables include age, gender, education, marital status, interests, geographic location, role in the community, and influence in the community.

The ability to situate a conversation in a social context may be useful in determining a meaning of a certain ambiguous word or phrase. For example, the word "bank" could refer to a "river bank" or a "savings bank." Rather than merely investigating vocabulary found alongside the ambiguous word or phrase (e.g., finding associated instances of the words "water" or "financial institution"), the analysis based on the social context of the conversation instead seeks to associate the data file containing the word or phrase with a particular social community (i.e., sub-net). For example, a data file may be identified as being associated with a "water resource related" social community or a "financial institution related" social community. By situating the data file within one of these social communities, the meaning of the word "bank" may be ascertained.

FIG. 2 depicts an example list of key terms 200 used as part of a computer-implemented file classification engine. In FIG. 2, the list of key terms 200 includes terms 202 that are related to or representative of a topic 204, "3d hd, 120 hz, hd, +screen." The list of key terms 200 of FIG. 2 further includes a weight 206 and a role 208 for each term 202. The weight 206 may be a value that indicates a level of relatedness of the term 202 to the topic 204. For example, terms 202 that are highly representative of the topic 204 may have a higher weight 206, while terms 202 that are less representative of the topic 204 (e.g., terms 202 that have multiple meanings and thus may or may not refer to the topic 204) may have a lower weight 206. The role 208 included in the list of key terms 200 may describe a part of speech for the terms 202 (i.e., the designations "noun" and "verb" indicated in FIG. 2) or may be used to characterize a role of a term 202 in a different way (e.g., use in opinion propositions). The example list of key terms 200 may be used in the context of a file classification engine to identify data files having a common characteristic (e.g., the file classification engine 104 of FIG. 1).

As described above, a list of key terms like the list 200 of FIG. 2 may be generated by first extracting an initial list of key terms from a plurality of data files (e.g., a text corpus) and then updating the initial list based on an analysis that groups the data files according to their social community associations. The list of key terms 200 may be further expanded by determining meaningful combinations or permutations (i.e., hypernyms) of the terms 202 and adding them to the list 200. Determining the combinations or permutations of the terms 202 and adding them to the list 200 is used to further increase the ability of the list 200 to identify data files related to the topic 204. The combinations or permutations may be defined in a particular social community context. For example, while a synonym is universal in its application (e.g., the use of "big" as a synonym for "large" may apply without restriction), the hypernyms used to expand the list of key terms may apply to only a particular social community. For example, "big" and "large" may be determined to be combinations or permutations for the "dimension topic" as identified among members of a social community, where the social community is defined as including participants who discussed "dress size" in a set of emails. Further, the combinations or permutations may be distinguishable from traditional synonyms in that they may be formed through a decomposition of term aggregates in a specific hierarchical fashion. In one example, the combinations and permutations are identified at the highest through lowest levels of aggregations in the following order: class or category, topic, noun phrase, named entity, part of speech, bigram, and raw term.

FIG. 3 is a block diagram of an example system 300 for generating a list of key terms 302 from a plurality of data files 304. The data files 304 may include documents of various types (e.g., text documents, documents containing financial data, documents containing medical data). Certain of the data files 304 have a common characteristic 312 (i.e., they would be classified under a particular category or topic) and certain of the data files 304 do not have the common characteristic 314. The common characteristic may vary across different document types. As illustrated in the example of FIG. 2, the common characteristic may be a particular topic (i.e., subject matter) for textual documents. In another example where the data files 304 relate to financial information, the common characteristic may be an indication that a particular person is likely to default on a loan. Further, the common characteristic of the data files 304 may be defined broadly or narrowly. For example, the common characteristic may be that a document relates to sports, generally, or alternatively, that the document relates to a particular sporting event.

The data files 304 are received by the key term generation engine 306 and analyzed to generate the list of key terms 302. In particular, the key term generation engine 306 may perform operations 316 to generate the list of key terms 302. At 320, the operations 316 begin with the key term generation engine 306 receiving the data files 304. At 322, an initial list of key terms is generated. The initial list of key terms may include only those terms from the data files 304 that are determined to be associated with the common characteristic, or the initial list of key terms may include all of the terms of the data files 304. Where the initial list of key terms includes all of the terms of the data files 304, the list may also include some form of ranking for the terms. As illustrated in FIG. 2, the ranking may be a weight value for each of the terms. Alternatively, the terms may be ranked based on the number of times they appear in the data files 304 or via another metric. The initial list of key terms may be created manually by a person or may be automatically generated using a computer-implemented algorithm (e.g., the list of key terms may be automatically generated using SAS Text Miner® software sold by SAS Institute Inc. of Cary, N.C.).

At 324, the data files 304 are classified within a hierarchical structure. The classifying of the data files 304 within the hierarchical structure is used to determine associations of the data files 304 with a plurality of different social communities, where each of the plurality of social communities is defined by one or more features. The hierarchical structure may include both upper nodes and lower nodes configured to group data files having similar characteristics, where each of the nodes is associated with a particular social community and is thus defined by the one or more features of the particular social community. Upper nodes of the hierarchical structure group the data files 304 based on general similarities, and the lower nodes of the hierarchical structure group the data files 304 based on specific similarities. An example of a general similarity used to group data files within an upper node is an association of the grouped data files with a particular, common website (e.g., all of the grouped data files of the upper node include messages posted to a particular Internet discussion forum). An example of a specific similarity used to group data files within a lower node would be an association of the grouped data files with a particular status on a particular website (e.g., all of the grouped data files of the lower node include messages posted to a particular Internet site, where creators of the messages are identified as being "leaders"). At 326, data files having an association with a particular social community are identified. The particular social community is associated with a particular node of the hierarchical structure, and thus, the data files having the association with the particular social community are those data files classified within the particular node of the hierarchical structure. At 328, features are extracted from the data files having the association with the particular social community. The features may include new vocabulary and modes of expression used to describe the common characteristic and may be extracted by analyzing as a group the data files having the association with the particular social community. At 330, the list of key terms 302 is updated based on the extracted features.

Figure 4:
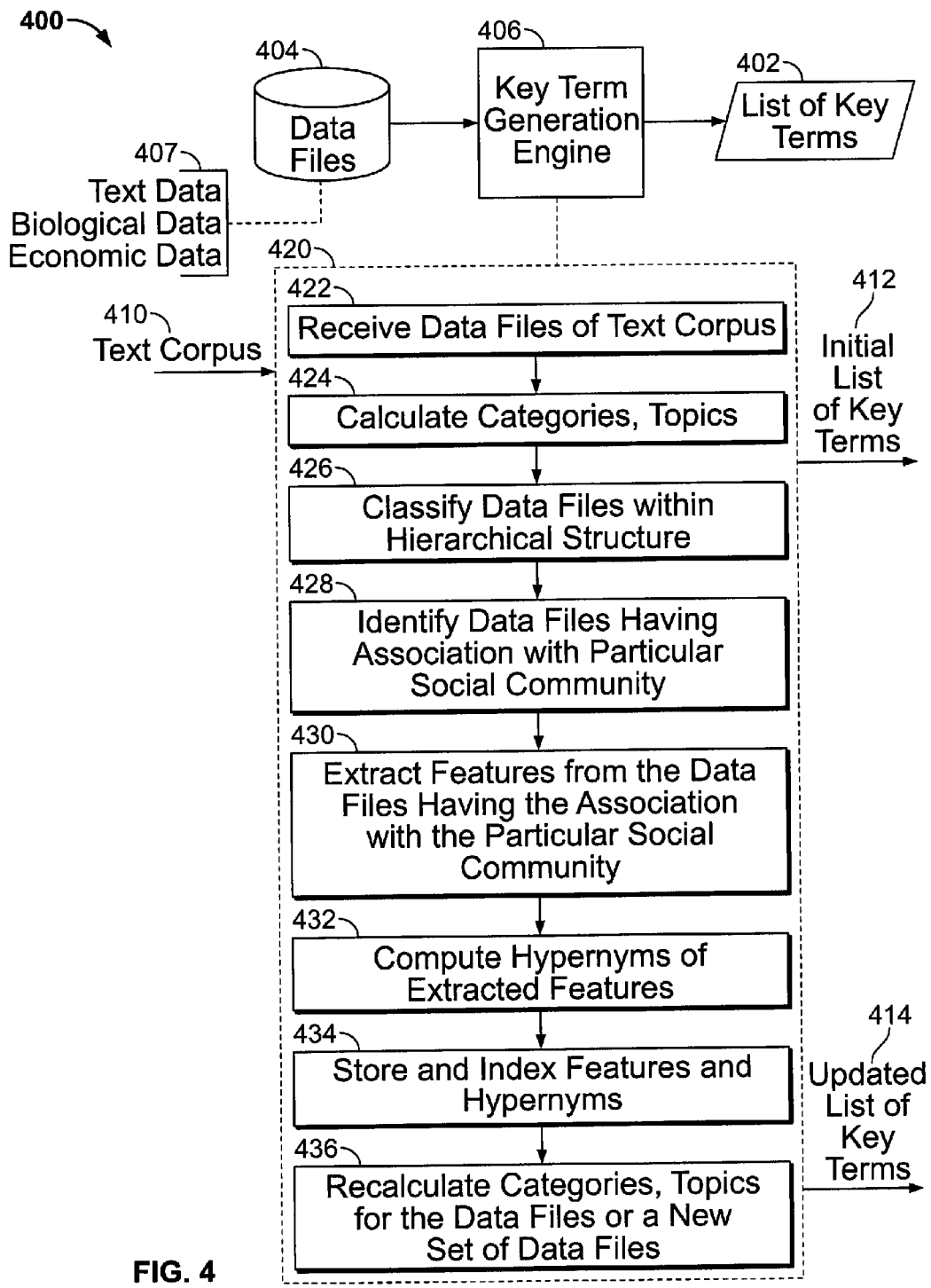
FIG. 4 is a block diagram of another example system for generating a list of key terms from a plurality of data files.

FIG. 4 is a block diagram of another example system 400 for generating a list of key terms 402 from a plurality of data files 404. Similar to FIG. 3, the data files 404 are used as input data for a key term generation engine 406, with certain of the data files 404 having a common characteristic (e.g., being related to a particular category, topic, or classification) and certain of the data files 404 not having the common characteristic. The data files 404 of FIG. 4 may be of different types and may include, for example, text data, biological data, and/or economic data 407. The particular type of data included in the data files 404 may affect a function that the list of key terms 402 is configured to perform. For example, if the data files 404 include text documents (i.e., articles, webpages, text extracted from social media websites), the list of key terms 402 may be used in performing a text categorization function or in generating search strings for a search engine, as illustrated in FIGS. 1A and 1B. If the data files 404 include biological data, the list of key terms 402 may be used in making a determination as to whether an individual is likely to develop a particular medical condition. When the data files 404 include such biological data, terms in the list of key terms 402 may include DNA data, RNA data, or genomic data, for example. If the data files 404 include economic data, the list of key terms 402 may be used in making a determination as to whether an individual is likely to purchase an item or default on a loan. When the data files 404 include such economic data, the terms included in the list of key terms 402 may include purchasing data, stock market data, financial data, loan data, or credit history data, for example.

Using the data files 404 as input, the key term generation engine 406 performs operations of flowchart 420 to generate the list of key terms 402. In the example of FIG. 4, the data files 404 may include a text corpus 410, which is used as an input to the flowchart process 420. At 422, the text corpus 410 is received. At 424, categories or topics are calculated from the text corpus 410. The categories or topics may be calculated using any appropriate technique. For example, the categories may be calculated automatically using the SAS Enterprise Content Classification® "automatically detect sub-categories" feature, and the topics may be automatically calculated using the SAS Text Miner® "Text Topics" node. Based on the calculation of the categories or topics, an initial list of key terms 412 is extracted from the data files 404. The initial list of key terms 412 may be similar to the list 200 of FIG. 2, which includes the terms 202 associated with the calculated topic or category 204 and a weight value 206 for each term. At 426, the data files 404 are classified within a hierarchical structure. Each node of the hierarchical structure is associated with a different social community, and a decision tree may be used to build the hierarchical structure of social communities and to perform the classification. The decision tree may employ a criterion sensitive to a presence or an absence of the key terms 412 in the data files 404 so that successive sub-nodes of the decision tree contain increasingly "pure" sub-sets of the data files 404 and the similarities within the data files of the sub-nodes increase.

At 428, data files having an association with a particular social community are identified by isolating data files classified within a particular node of the hierarchical structure. At 430, the data files having the association with the particular social community are analyzed, and features (e.g., words, phrases, sentences, symbols) are extracted from the data files. At 432, hypernyms of the extracted features are computed. The hypernyms are combinations or permutations of the extracted features. In the example of FIG. 4, the hypernyms include synonyms, collocations, sequential collocations, bigrams, noun phrases, named entities, parts of speech, and raw terms. At 434, the extracted features and the computed hypernyms are stored and indexed. The stored and indexed features and hypernyms are used to update the initial list of key terms 412 to produce an updated list of key terms 414. At 436, the categories or topics calculated at operation 424 are recalculated for the data files 404 or for a new set of data files. The recalculation utilizes the updated list of key terms 414, and thus, the recalculation is expected to return a greater number of documents pertaining to the categories or topics as versus the first calculation 424.

The key term generation engines 306, 406 of FIGS. 3 and 4 may function in part based on an acknowledgement of the conversational nature of text documents. Even in the traditional text document publishing model there is an implied conversation between the publisher and consumer. More recently, with electronic transmission of data files, document sourcing, distribution, and sharing is increasingly multi-sided and multi-directional, as in typical conversations. Therefore, it may be said that all text documents are fundamentally conversational in nature. The recognition of text documents as conversation and the inclusion of conversational analytics in text document analysis may be beneficial because the analysis and interpretation of the textual content and meaning can be informed by the social context that surrounds the conversation. In the example of FIG. 4, the social context informs the analysis of the data files 404 because extraction of the features used to update the list of key terms 412 occurs within the context of data files associated with the particular social community. Identification of the social context that surrounds the conversation and of the characteristics associated with the particular social community provide additional information that can be used in the analysis and interpretation of the text.

FIG. 5 illustrates an example of category and topic calculation 500 used in generating an initial list of key terms from a plurality of input data files. With reference to FIG. 4, operation 424 of the flowchart 420 includes calculating categories and topics in order to generate an initial list of key terms from a plurality of input data files. Specifically, the calculation of the categories and topics from the input data files may be performed in order to associate certain or all of the terms of the input data files with the calculated categories and topics. An example of the categories and topics derived from a text corpus is illustrated in FIG. 5 at 500. The categories and topics may be derived from the input data files using any appropriate technique. For example, a manual technique may be used to derive the categories and topics, where a person manually selects the categories and topics, as well as the key terms associated with the categories and topics from the plurality of input data files. In another example, an automatic, computer-implemented algorithm may be used to discover the categories and topics. In this example, the categories may be automatically discovered using SAS's Enterprise Content Classification® "automatically detect sub-categories" feature, and the topics may be automatically discovered using SAS Text Miner® "Text Topics" node.

The category and topic calculation 500 of FIG. 5 includes three columns. A first column 502 includes all of the terms in the plurality of data files ordered by frequency. In the example of FIG. 5, the term "laptop" appears most frequently in the plurality of data files. A second column 504 indicates whether the terms of the first column 502 belong to one of the calculated categories. In the example of FIG. 5, a category for "laptop" and a category for "screens" are shown in the table. A third column 506 includes calculated topics 1-3. Calculated topics that contain one or more terms that appear in the plurality of data files appear on the same row as the first term that the topic contains. Topic 1 includes "gaming, high-end, game laptop" and appears on the row opposite of the term "gaming." Topic 2 includes "120 hz, desktop, heavy-duty," and appears on the row opposite of the term "120 hz." Topic 3 includes "refresh, rate, game," and appears on the row opposite of the term "refresh."

After the categories, topics, and their associated terms have been calculated, the categories, topics, and terms can be used to develop a scoring model that can be applied to the plurality of input data files or to another set of data files. The scoring model is used to identify data files of the plurality of data files or the another set of data files that are related to the calculated categories or topics. As is described in further detail below, the initial list of terms generated as a result of the category and topic calculation may be updated based on an analysis of the input data files that groups the data files according to their social community associations. When the scoring model is reapplied to the plurality of data files following the updating of the list of key terms, it is expected that the scoring model will determine greater numbers of the data files to be associated with the calculated categories or topics.

Figure 6A:
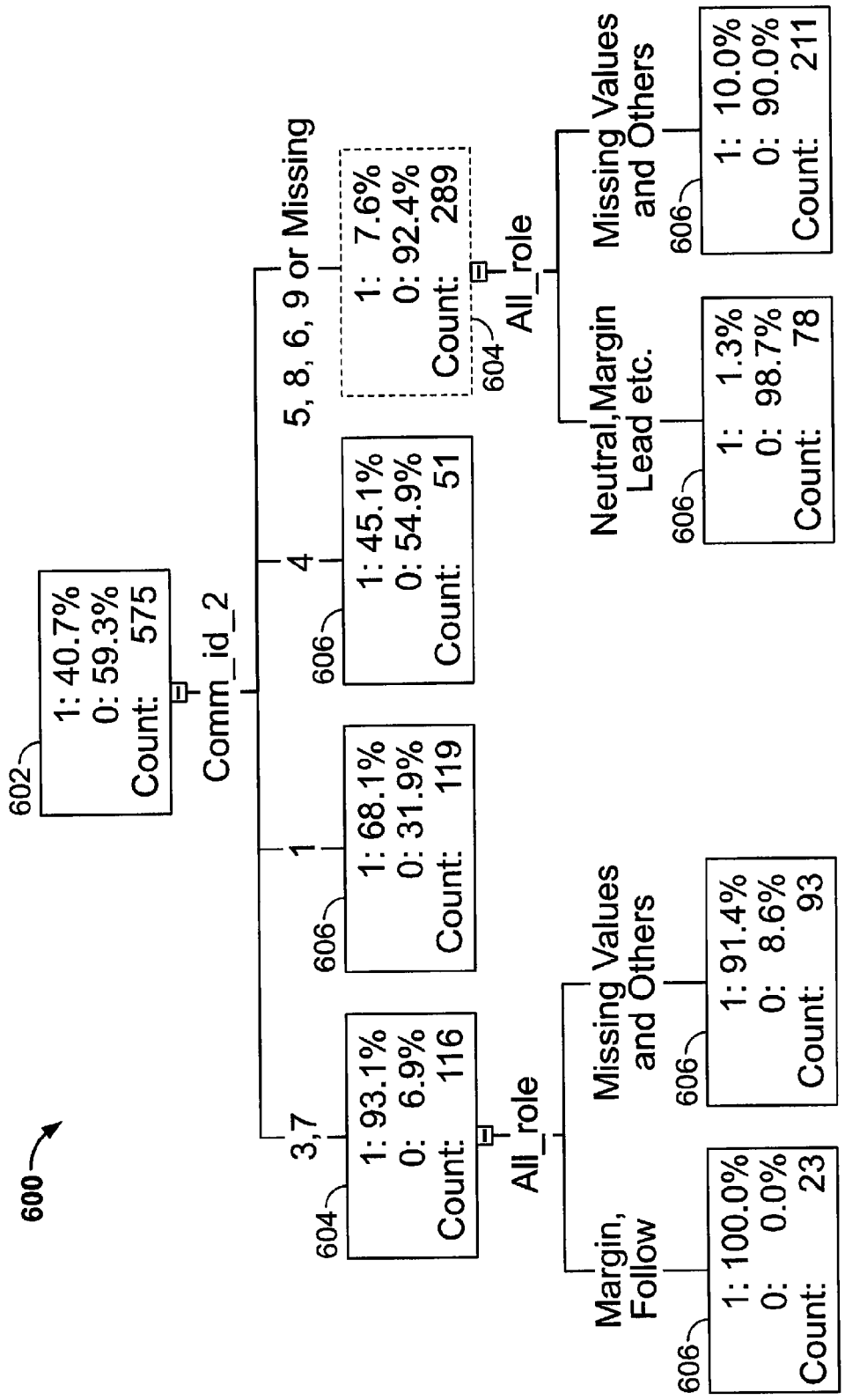
FIGS. 6A and 6B depict example hierarchical structures used in classifying a plurality of data files.

FIG. 6A depicts an example hierarchical structure 600 used in classifying a plurality of data files. As described above, with reference to FIGS. 2 and 3, data files from a plurality of input data files are identified as having associations with different social communities, where each of the social communities is defined by one or more features. In the example of FIG. 6A, the identification of the data files with the different social communities is performed by classifying the data files within the nodes of the hierarchical structure 600. The hierarchical structure 600 includes upper nodes 604 and lower nodes 606 configured to group data files having similar characteristics, where each of the nodes is defined by the one or more features associated with a particular social community. In the example of FIG. 6A, certain nodes that appear in the upper portion of the hierarchical structure are characterized as being lower nodes because no further node branching occurs below them.

Data files are classified within the upper nodes 604 of the hierarchical structure 600 based on a physical connection between the data files or based on a semantic connection between the data files. The data files classified within the upper nodes 604 are classified as such based on general similarities between the data files. The physical connection between the data files classified within an upper node 604 is based on an observed message exchange that occurs between the classified data files. For example, on Internet blog sites and social media sites (e.g., Twitter, Facebook), messages and postings from users may be linked by a common "thread." On Internet blog sites, thread links exist when individuals post messages to a common blog title or post comments in response to an initial blog posting. On social media websites, thread links exist when individuals reply to messages from others or repost others' original messages (e.g., using Twitter's "retweet" feature). The thread may also be defined by email header fields, a common thread field in a database, a common topic on a discussion forum, or a common social media message. Similar mechanisms exist in most forms of electronic messaging.

The physical connection implied by the message exchanges between data files are used to classify the data files into the upper nodes 604 in FIG. 6A. In one example, connections (e.g., links or edges) are defined between the physically connected data files to form a network of data files. Metric characteristics of the network are used to derive community membership and place the data files into the upper nodes 604 of the hierarchical structure 600. The community membership may be derived by grouping the data files into communities such that there is a higher density of links within communities than between communities.

As noted above, the data files are also classified within the upper nodes 604 of the hierarchical structure 600 based on the semantic connections between the data files. Thus, linkages between the data files may be determined based on shared semantic characteristics of the data files. The shared semantic characteristics may be indicated based on patterns of nouns, verbs, other parts of speech or words within the data files. When classifying data files using this view of connectivity, there may not be a physical connection (i.e., an observable message exchange) between the data files. Further, the data files do not need to be part of a common network or be of a shared geography. Rather, when classifying the data files into the upper nodes 604 based on the semantic connections, a connection may be determined to exist based solely on the shared semantic content. However, in another example, in order to define a semantic connection, the data files may be required to carry the shared semantic content within a shared time frame.

Shared semantic content may be determined by computing singular value factorizations of the data files that appear in an input text corpus. Singular value decomposition (SVD) scores may be calculated for all of the input data files and these scores may then be clustered together. All data files of a same cluster may be defined as similar and therefore may be determined to share a common semantic link with one another. Each cluster may be used to define a separate and mutually-exclusive upper node 604 of the hierarchical structure 600.

A data file may be classified within the lower nodes 606 of the hierarchical structure 600 based on a social organization characteristic of the data file, an individual descriptive characteristic of the data file, a psychological characteristic of the data file, an operational characteristic of the data file, or a combination of these characteristics. The social organization characteristic indicates a social position associated with the data file. The social organization characteristic may be based on a geographic or temporal location; a social role (e.g., leader, follower, marginal) of a creator of the data file; social influence of the creator of the data file; community size, density, or dispersion; or community character (e.g., friends, family, business associates, social, recreational or spiritual groups). The individual descriptive characteristic indicates a personal characteristic of the creator of the data file. The individual descriptive characteristic may be based on age; gender; education; marital status; or interests, affiliations, or memberships of the creator of the data file. The psychological characteristic of the data file may indicate a psychological state of the creator of the data file. The psychological characteristic may be based on a mood state of the creator of the data file or an introversion or extroversion score for the creator of the data file. The operational characteristic indicates characteristics of message exchange associated with the data file. The operational characteristic may be based on message recency; message frequency; conversation acceleration rate; message mood state; or type of exchange (e.g., personal or professional).

A decision tree may be used to create the hierarchical structure 600 and to classify the data files within the upper and lower nodes 604, 606. The decision tree may employ a criterion sensitive to a presence or an absence of key terms in the plurality of data files (i.e., terms determined to be relevant to a category, classification, or topic calculated based on an analysis of the data files, as illustrated in the topic and category calculation FIG. 5). The nodes of the decision tree may be computed via an algorithm that determines the relationship between the calculated category, classification, or topic and various characteristics of the data files. Specifically, the nodes of the hierarchical structure may be determined by searching for important relationships between the calculated category, classification, or topic and the social organization characteristics, the individual descriptive characteristics, the psychological characteristics, and the operational characteristics of the data files. The important relationship may be any that shows that a particular characteristic or combination of characteristics is statistically significant. For example, in FIG. 6A, as explained below, 100% of data files classified as being associated with communities 3 or 7 that were created by one having a "marginal" or "follower" status are determined to pertain to the topic under investigation in FIG. 6A. Such a relationship between the characteristics of the data files and the topic may be determined to be statistically significant and worthy of further analysis within the hierarchical structure 600. Combinations of the social organization characteristics, the individual descriptive characteristics, the psychological characteristics, and the operational characteristics may be identified to determine the nodes of the hierarchical structure 600 using supervised decision tree analysis.

In the example of FIG. 6A, before the hierarchical structure 600 branches at the upper nodes 604, a top node 602 indicates that discussion of a particular topic 1 accounts for approximately 40% of the conversations in the input data files (e.g., an input text corpus). As illustrated at the top node 602, there are 575 total input data files. At the upper nodes 604, when data files associated with communities 3 or 7 are isolated, approximately 93% of these data files are related to topic 1.

At the lower nodes 606 of the hierarchical structure 600, one or more of the social organization characteristics, the individual descriptive characteristics, the psychological characteristics, and the operational characteristics may be used to classify the data files. The lower nodes 606 branching from the upper node associated with the communities 3 or 7 are used to further classify the data files based on whether the creator of each data file has a "marginal" or "follower" role. When the community role is identified as "marginal" or "follower" at the lower nodes 606, the incidence of topic 1 increases to 100%, and when the community role is defined as "other" (which may include the "leader" role), the incidence of topic 1 discussion decreases to approximately 91%.

Each of the upper and lower nodes 604, 606 of the hierarchical structure 600 define social communities, with each of the social communities being defined by one or more features. The one or more features may be discriminating features that define homogenous sub-groups of a larger population, where the homogenous sub-groups are groups from which changes in vocabulary and modes of expression used to describe the category, classification, or topic are expected to develop (i.e., memetic variants). The changes in vocabulary and modes of expression may point to subtle and gross changes in vocabulary used to describe the category, classification, or topic. In some examples, the changes in vocabulary and modes of expression may be leading indicators of new forms of language or indicators of memetic changes in vocabulary that may be monitored to ensure consistent topic tracking over time.

Figure 6B:
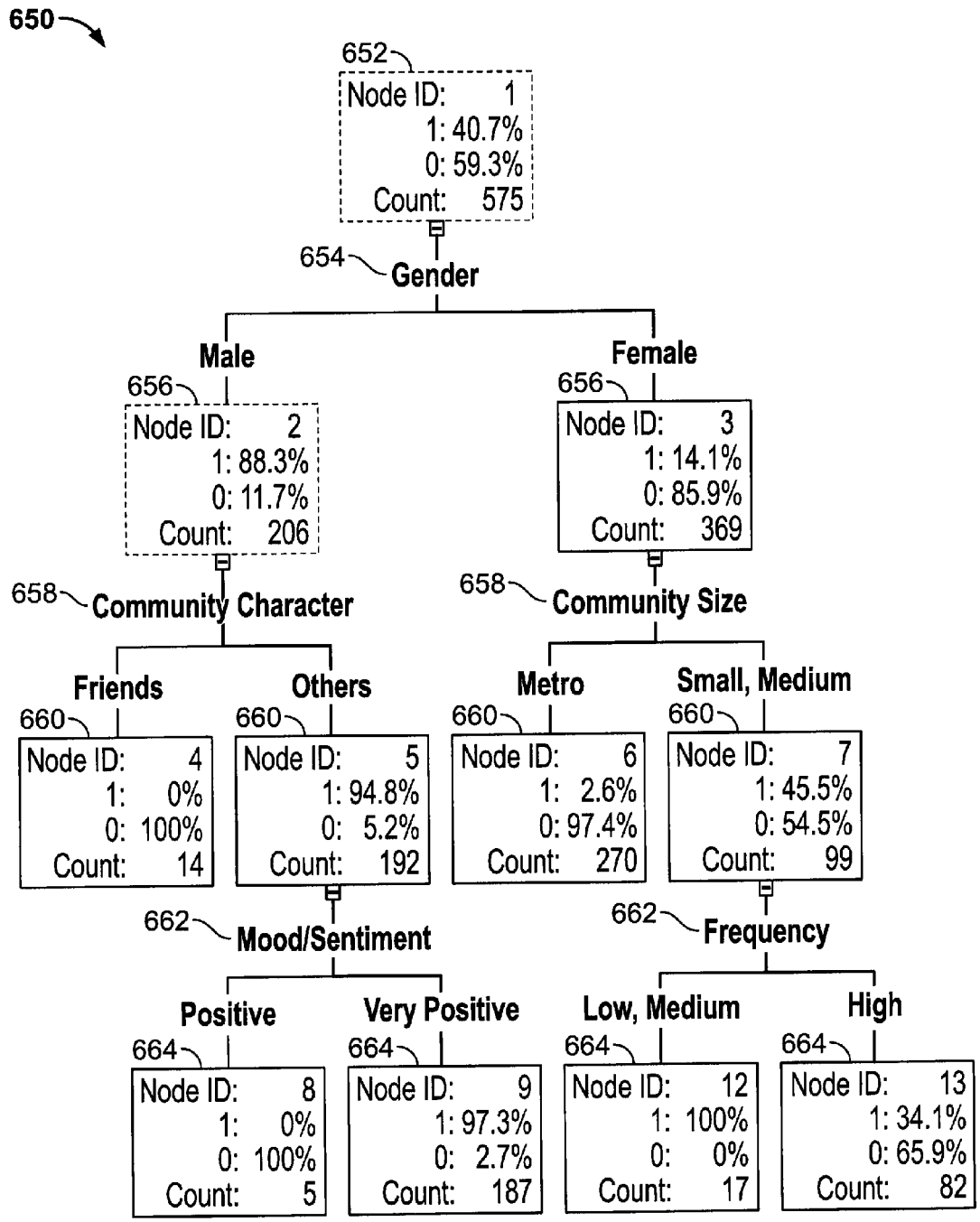

FIG. 6B depicts another example hierarchical structure 650 used in classifying a plurality of data files. In FIG. 6B, data files classified within an uppermost node 652 may be data files that have previously been grouped together based on a physical connection or a semantic connection between the classified data files (i.e., the uppermost node 652 may be similar in nature to the upper nodes 604 of FIG. 6A, where data files are classified based on physical or semantic connections). Thus, all further classification of the plurality of data files within nodes below the uppermost node 652 may be based on individual descriptive characteristics, social organization characteristics, and operational characteristics of the data files. In an example system, any or all of these types of characteristics may be used in defining the social communities, but at least one of the three types of characteristics may be necessary to form a viable social community.

In the example of FIG. 6B, the definition of a social community utilizes a specific sequence of characterization. Specifically, individual descriptive characteristics that are relevant to the social community are first employed, social organization characteristics that are relevant to the social community are employed next, and finally, operational characteristics that are relevant to the social community are employed last. In the hierarchical structure 650, an individual descriptive characteristic 654, "gender," is used first to sub-set the data files classified within the uppermost node 652 to form descendent sub-groups 656. Each of the descendent sub-groups 656 contains a plurality of data files that are selected based on the individual descriptive characteristic 654. Social organization characteristics 658, "community character" and "community size," are next used to sub-set the data files classified within the descendent sub-groups 656 to form another set of descendent sub-groups 660. Each of these sub-groups 660 contains a plurality of data files that are selected based both on the individual descriptive characteristic 654 and the social organization characteristic 658. Finally, operational characteristics 662, "mood/sentiment" and "frequency," are used to sub-set the data files classified within the descendent sub-groups 660 to form yet another set of descendent sub-groups 664. The sub-groups 664 include data files selected based on all three types of characteristics (i.e., individual descriptive, social organization, and operational characteristics). The branching process of FIG. 6B may terminate when all of the descendent data files have no variability in the data file contents that would result in a formation of further groups of data files.

The social community descriptors are used to operationalize and describe the environment and circumstances that affect the expression-generating event. Example social community descriptors for the "gender" individual descriptive characteristic 654 include "male" and "female." Example social community descriptors for the "community character" social organization characteristic 658 include "friends" and "others." Example social community descriptors for the "community size" social organization characteristic 658 include "metro" and "small, medium." Example social community descriptors for the "mood/sentiment" operational characteristic 662 include "positive" and "very positive." Example social community descriptors for the "frequency" operational characteristic 662 include "low, medium" and "high."

As described above, in the example of FIG. 6B, the definition of a social community utilizes a specific sequence of characterization (i.e., individual descriptive characteristics are used first, followed by social organization characteristics, and finally operational characteristics). Within characteristics of the same type (e.g., within the individual descriptive characteristic type), use of a specific sequence of characterization is optional or is determined by a strength of association between a particular characteristic and the target value (i.e., the topic, category, or classification under consideration).

The specific form of the social community may be calculated using hardware or software that includes a decision tree modeling capability (e.g., SAS Enterprise Miner® software sold by SAS Institute Inc. of Cary, N.C.). The decision tree modeling capability shows the relationship between a target value (i.e., the topic, category, or classification) and various input values (i.e., the individual descriptive, social organization, and operational inputs). The hierarchical structure 650 is formed by searching for important relationships between the topics, categories, or classifications that have been extracted at the top-level text corpus and the three sets of field values (i.e., the individual descriptive, social organization, and operational characteristics) that have been calculated as social community discriminators. As is illustrated in the example hierarchical structure 650 of FIG. 6B, use of the decision tree permits identification of combinations of social community discriminators.

The classification method of FIGS. 6A and 6B places the discovery of meaning and interpretation of the data files in the context of a social network, where the information exchange in the data files is viewed as a multi-sided conversation. The conversation takes place among social network members who are participants in a local social community (i.e., sub-net) that has specific characteristics that define the nature of the social community and the associated behavioral attributes of the conversation. The use of social communities in the analysis may allow a greater number of expressions to be associated with a given topic, which may allow the topic to be more effectively tracked over time. The classification method of FIGS. 6A and 6B may be used in the search and tracking of themes, topics, and concepts in any collection of data files, including electronically-encoded text such as that found on the Internet, in social media, and in blog archives.

Although the example classification method of FIGS. 6A and 6B describes a particular method of building a hierarchical structure for classifying the input data files within social communities, other methods of defining a social context for the input data files may be used. In one example, the social context for the input data files is defined based on identities of the senders or recipients of the data files (i.e., "who"), the platform or medium of communication used to transmit the data files (i.e., "how"), the physical locations of the senders or recipients of the data files (i.e., "where"), the time in which the data files are transmitted (i.e., "when"), the information transmitted in the data files (i.e., "what"), and the intention behind the transmission of the data files (i.e., "why"). The senders or recipients of the data files may be defined by threads or addresses (e.g., email addresses). For example, most Internet discussion forums include thread indicators that keep track of which messages go to which recipients. On the website Twitter, for example, the community includes followers who receive messages as well as individuals that reply to messages or forward (i.e., "retweet") messages to others. The platform or medium of communication used to transmit the data files may include websites like Facebook and Twitter, and the data files may be transmitted via queries, posts, and requests for comment, among other methods. The physical location of the senders or recipients of the data files may be inferred by the registration information of the user, determined via geo-coordinates, or derived by locations indicated in a data file itself. The time in which the data files are transmitted may be extracted from a time stamp of a data file or may be determined by time referents in the data file. The intention behind the transmission of the data files may be extracted from the social context of the data files (e.g., a purchase may be a purchase intention).

FIG. 7 depicts aspects of an example process from which textual expression emerges in human beings. At 702, a trigger event is illustrated, where the trigger event is a use of a particular expressive term. The trigger event 702 results from the top-down flow of the environment 704 and circumstances 706 of the conversation in which the term appears. The environmental context is translated through the neurochemistry, psychology, and physiology 708 of the message originator and results in a generation of a given expression as illustrated at 710 of FIG. 7. The expression 710 occurs via a particular state/medium 712 (e.g., print, electronic, verbal). The expression 710 is filtered through the participants' individual characteristics, social characteristics, and message characteristics, in that order. The individual background may influence social choices, and this context may further be influenced by the operational features of the messages that are exchanged in the conversation.

FIG. 8 depicts an example social community predictor table 800. The social community predictor table 800 corresponds to the hierarchical structure 650 of FIG. 6B and is used to store the one or more features that define the nodes of the hierarchical structure 650. In FIG. 8, columns of the example social community predictor table 800 include a sub-net ID column 802, a precondition column 804, and an outcome column 806. The subnet ID column 802 is an identification number used to reference a particular one of the nodes of the hierarchical structure 650 of FIG. 6B. The precondition column 804 identifies the one or more features that define each of the social communities represented by the nodes of the hierarchical structure 650. For example, with reference to FIG. 6B, the right-most bottom node is defined by the following features: gender is female, community size is small/medium, and frequency is high. In the example social community predictor table 800 of FIG. 8, this node corresponds to sub-net ID 802 number 6, which lists as a precondition 804 these particular features.

The outcome column 806 displays the incidence of a particular category, classification, or topic within the data files classified as being associated with a particular node of the hierarchical structure 650. For the sub-net ID 802 number 6, the outcome column 806 displays that the incidence of the particular category, classification, or topic is 34% (i.e., 34% of the data files classified within the node are related to the particular category, classification, or topic). The value in the outcome column 806 of FIG. 8 agrees with the value displayed in the right-most bottom node of FIG. 6B, which similarly illustrates that approximately 34% of the data files classified within the node are associated with the particular category, classification, or topic.

As described above, a list of key terms like the list 200 of FIG. 2 may be generated by first extracting an initial list of key terms from a plurality of input data files (e.g., a text corpus) and then updating the initial list based on an analysis of the data files according to the social community associations of the data files. The initial list of key terms may be expanded by analyzing and harvesting vocabulary from data files classified within a particular social community (i.e., data files classified within a particular node of a hierarchical structure). The harvested vocabulary may be placed in a table for use in identifying other data files having a common characteristic.

The list of key terms may be further expanded by determining meaningful hypernyms (i.e., combinations and permutations) of the terms of the list and adding them to the list. Determining the hypernyms of the terms and adding them to the list of key terms increases the capacity of the list to identify data files having the common characteristic. The hypernyms may be defined in a particular social community context. For example, while a synonym is universal in its application, the hypernyms used to expand the list of key terms may apply to only a particular social community. The hypernyms may be further distinguishable from traditional synonyms in that they may be formed through a decomposition of term aggregates in a specific hierarchical fashion. The hypernyms may involve bigrams, collocations, and other compound terms that do not exist as a contiguous entity in an input text stream.

Figure 9:
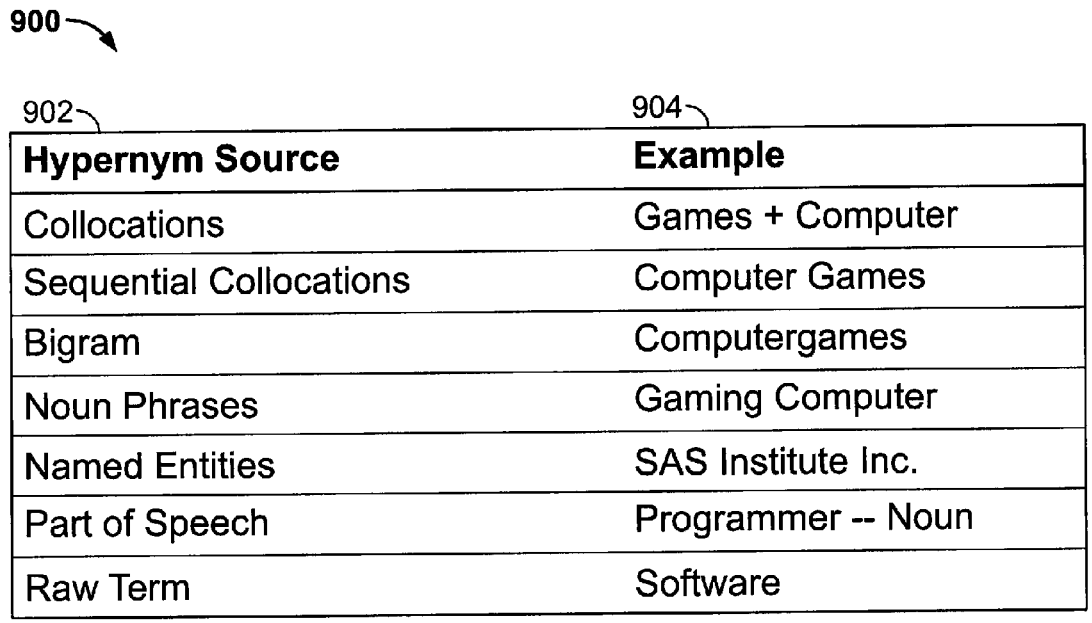
FIG. 9 depicts a table illustrating different hypernym sources and examples of each source.

FIG. 9 depicts a table 900 illustrating different hypernym sources 902 and examples of each source 904. The hypernym sources 902 of the table 900 are listed in order of granularity. Collocations and sequential collocations include term combinations that, while separate, are nevertheless present in the same textual context at a higher-than-average probability (e.g., "Games+computer," "computer games"). Bigrams are two contiguous terms with spaces and other term separators removed (e.g., "computergames"). Noun phrases and parts of speech are used as lower level precursors to bigrams (as are raw terms) (e.g., "gaming computer"). The hypernym sources 902 may also include named entities (e.g., "SAS Institute, Inc."), parts of speech (e.g., "Programmer—noun"), and raw terms (e.g., "software"). In the example of FIG. 9, the hypernyms are identified at the highest through lowest levels of aggregation in the following order: class or category, topic, noun phrase, named entity, part of speech, bigram, and raw term.

Figure 10:
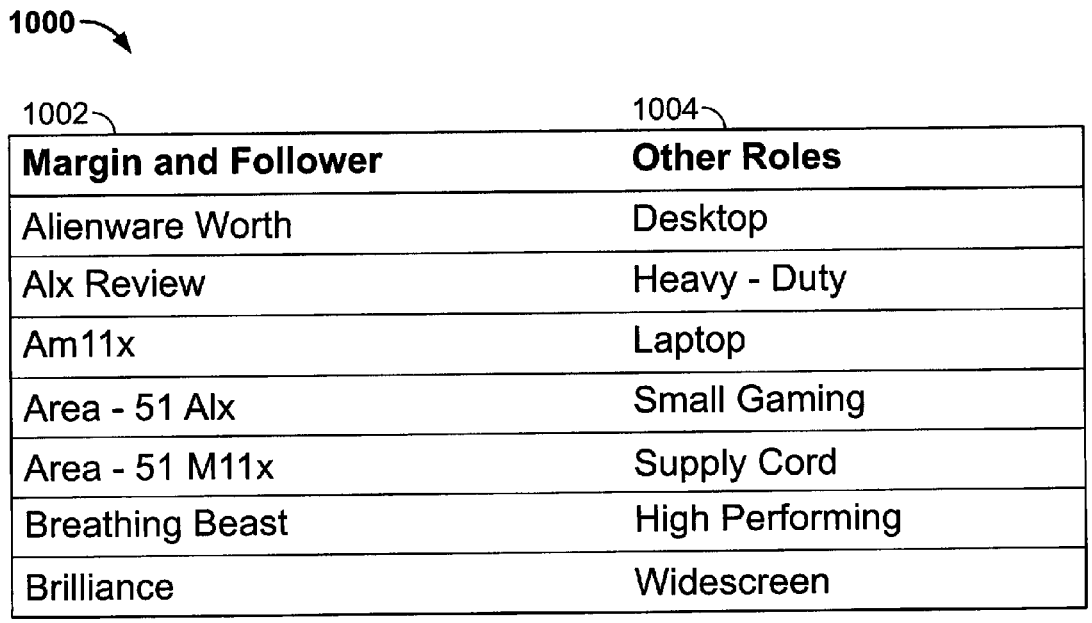
FIG. 10 illustrates a table including lists of hypernyms used to expand an initial list of key terms.

FIG. 10 illustrates a table 1000 including lists of hypernyms 1002, 1004 used to expand an initial list of key terms. A list of key terms representative of a category, classification, or topic may be further expanded by determining meaningful combinations and permutations (i.e., hypernyms) of the terms of the list and adding them to the list. In the table 1000, the list 1002 includes hypernyms for the left-most bottom node of FIG. 6A, which defines a social community that is associated with an upper node community 3 or 7, and where a creator of each of the data files has either a marginal or a follower status. Similarly, the list 1004 includes hypernyms for the closest node to the right of the left-most bottom node. The hypernyms of the lists 1002, 1004 may be added to the list of key terms representative of the category, classification, or topic associated with FIG. 6A. The updated list of key terms can be used to identify other data files that are related to the category, classification, or topic. Identifying the other data files may involve rescoring the original input data files with the updated list of key terms or applying the updated list of key terms to new, unknown data files. When the updated list of key terms is used to rescore the original input data files, it is expected that a higher number of data files will be identified as being associated with the category, classification, or topic, as compared to the initial scoring of the input data files based on the initial list of key terms.

Figure 11:
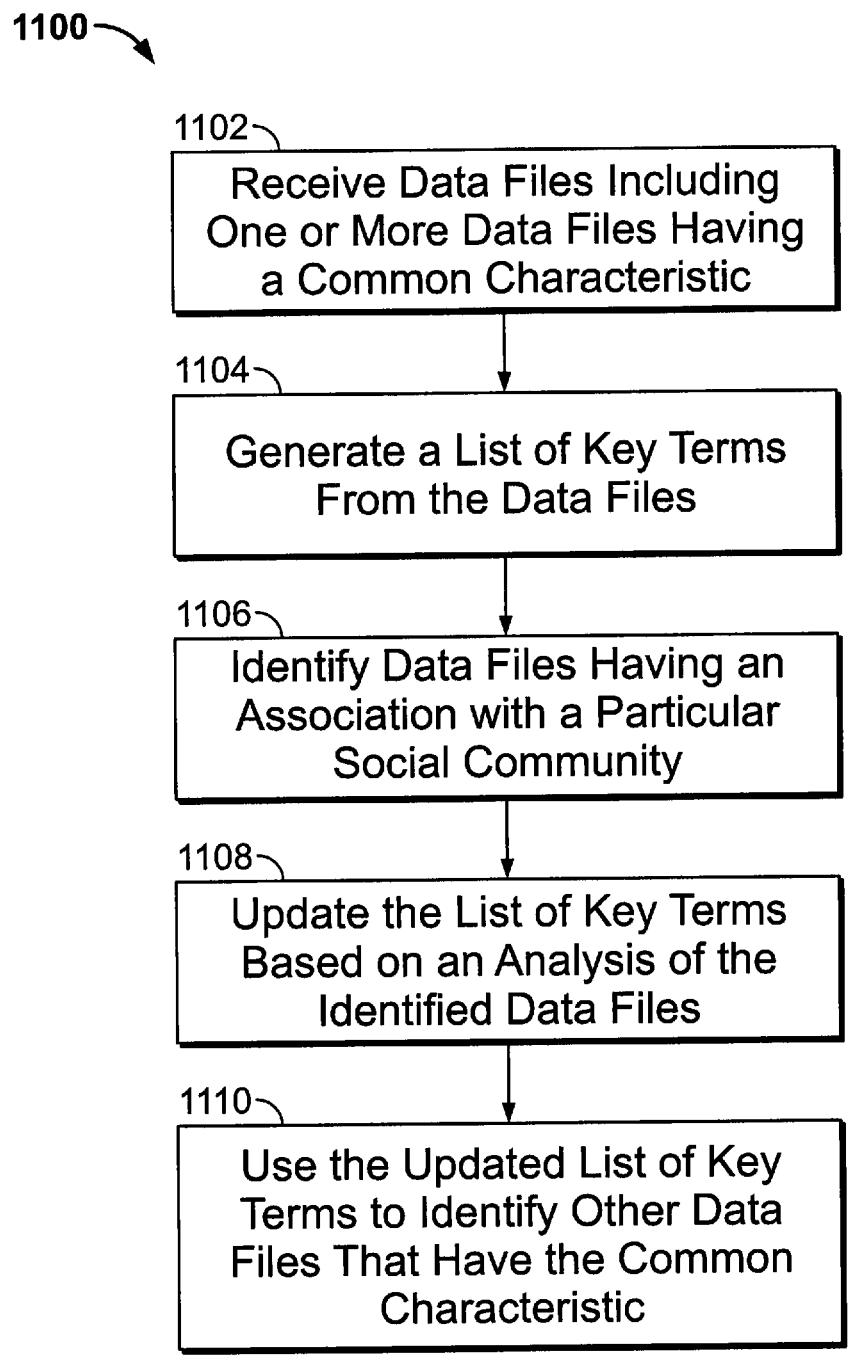
FIG. 11 is a flowchart depicting operations of an example method for identifying data files that have a common characteristic.

FIG. 11 is a flowchart 1100 depicting operations of an example method for identifying data files that have a common characteristic. At 1102, a plurality of data files including one or more data files having a common characteristic are received. At 1104, a list of key terms is generated from the plurality of data files. At 1106, data files having an association with a particular social community are identified. The particular social community is defined by one or more features. At 1108, the list of key terms is updated based on an analysis of the identified data files. At 1110, the updated list of key terms is used to identify other data files that have the common characteristic.

Figure 12A:
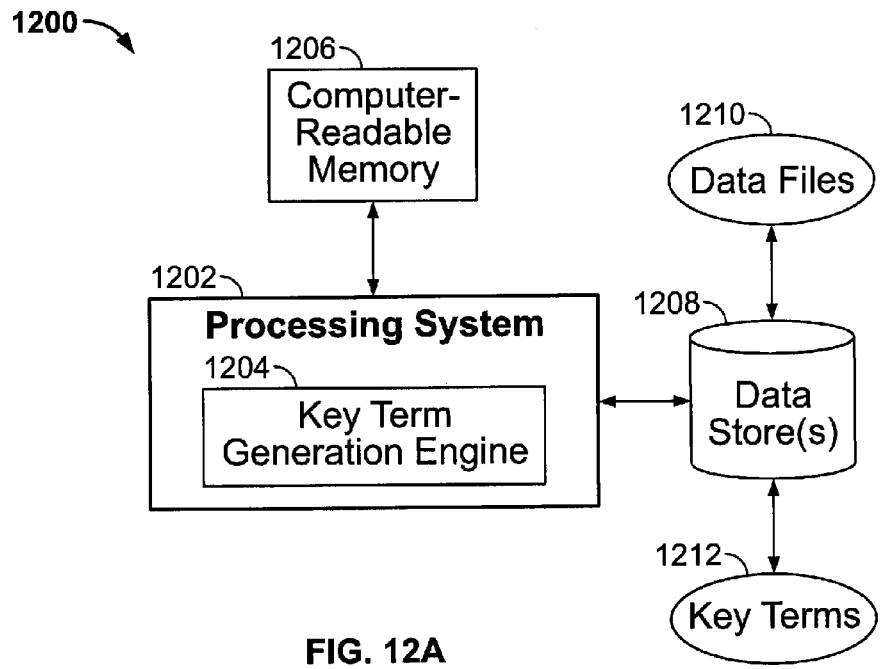
FIGS. 12A, 12B, and 12C depict example systems for use in implementing a key term generation engine.
Figure 12B:
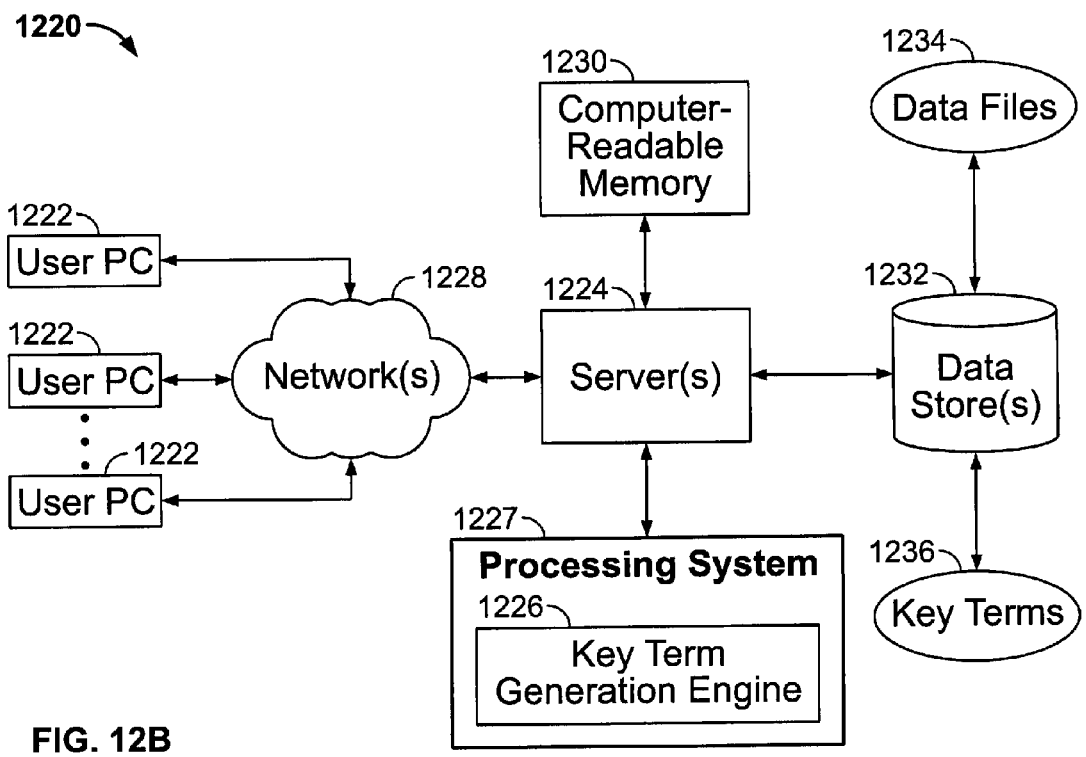
Figure 12C:
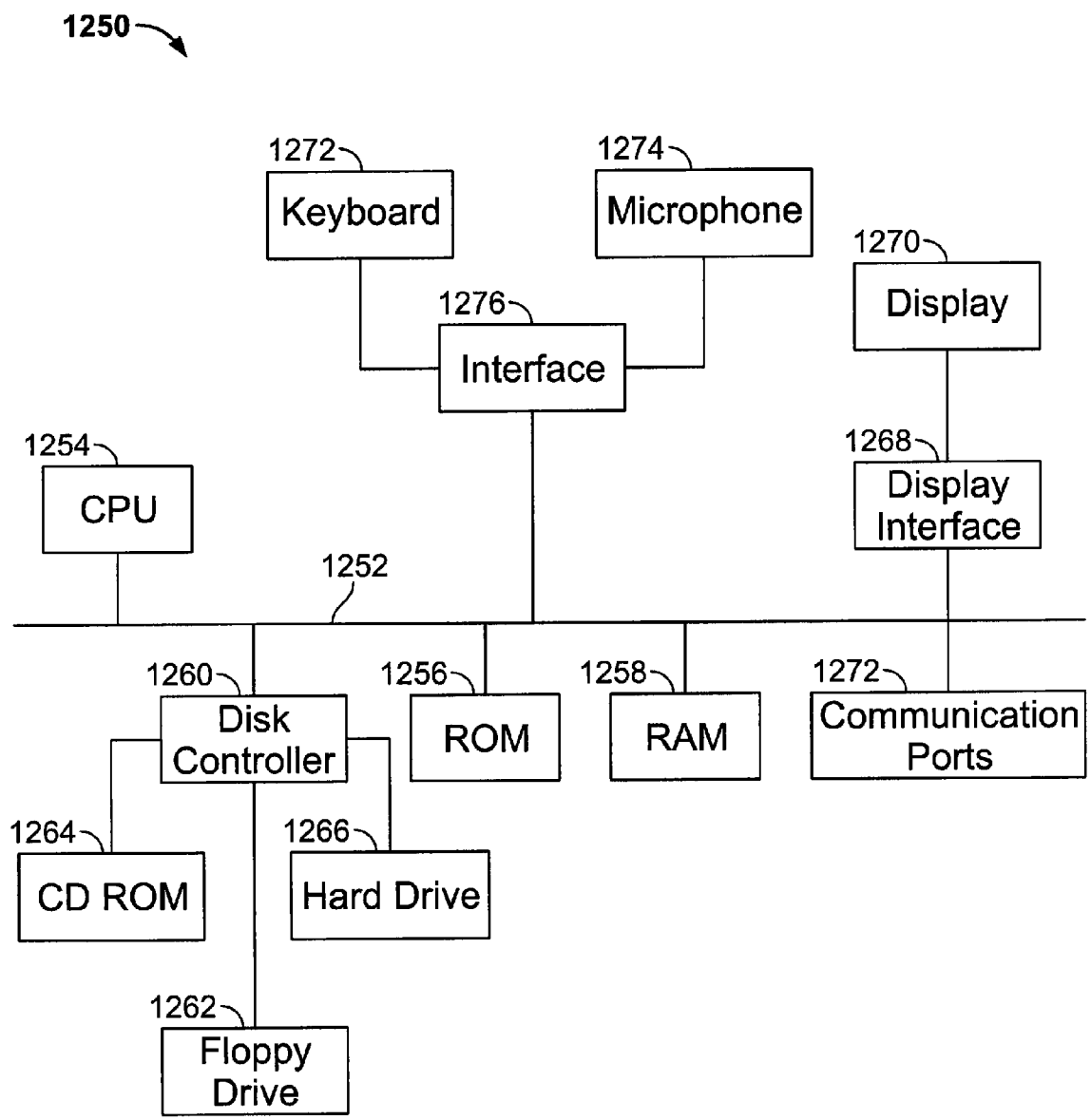

FIGS. 12A, 12B, and 12C depict example systems for use in implementing a key term generation engine. For example, FIG. 12A depicts an exemplary system 1200 that includes a standalone computer architecture where a processing system 1202 (e.g., one or more computer processors located in a given computer or in multiple computers that may be separate and distinct from one another) includes a key term generation engine 1204 being executed on it. The processing system 1202 has access to a computer-readable memory 1206 in addition to one or more data stores 1208. The one or more data stores 1208 may include data files 1210 as well as key terms 1212. The processing system 1202 may be a distributed parallel computing environment, which may be used to handle very large-scale data sets.

FIG. 12B depicts a system 1220 that includes a client server architecture. One or more user PCs 1222 access one or more servers 1224 running a key term generation engine 1226 on a processing system 1227 via one or more networks 1228. The one or more servers 1224 may access a computer-readable memory 1230 as well as one or more data stores 1232. The one or more data stores 1232 may contain data files 1234 as well as key terms 1236.

FIG. 12C shows a block diagram of exemplary hardware for a standalone computer architecture 1250, such as the architecture depicted in FIG. 12A that may be used to contain and/or implement the program instructions of system embodiments of the present disclosure. A bus 1252 may serve as the information highway interconnecting the other illustrated components of the hardware. A processing system 1254 labeled CPU (central processing unit) (e.g., one or more computer processors at a given computer or at multiple computers), may perform calculations and logic operations required to execute a program. A non-transitory processor-readable storage medium, such as read only memory (ROM) 1256 and random access memory (RAM) 1258, may be in communication with the processing system 1254 and may contain one or more programming instructions for performing the method of identifying data files that have a common characteristic. Optionally, program instructions may be stored on a non-transitory computer-readable storage medium such as a magnetic disk, optical disk, recordable memory device, flash memory, or other physical storage medium.

A disk controller 1260 interfaces one or more optional disk drives to the system bus 1252. These disk drives may be external or internal floppy disk drives such as 1262, external or internal CD-ROM, CD-R, CD-RW or DVD drives such as 1264, or external or internal hard drives 1266. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 1260, the ROM 1256 and/or the RAM 1258. Preferably, the processor 1254 may access each component as required.

A display interface 1268 may permit information from the bus 1252 to be displayed on a display 1270 in audio, graphic, or alphanumeric format. Communication with external devices may optionally occur using various communication ports 1272.

In addition to these computer-type components, the hardware may also include data input devices, such as a keyboard 1273, or other input device 1274, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A computer-implemented method for identifying data files that have a common characteristic, the method comprising:
   receiving a plurality of data files including one or more data files having the common characteristic;
   generating a list of key terms from the plurality of data files;
   classifying each data file of the plurality of data files within a hierarchical structure, the hierarchical structure including upper nodes and lower nodes configured to group data files having similar characteristics, wherein a data file is classified within a lower node of the hierarchical structure based on a psychological characteristic of the classified data file, wherein the psychological characteristic indicates a psychological state of the creator of the classified data file;
   identifying data files from the plurality of data files having an association with a social community, the social community being a homogenous sub-group of a larger population defined by one or more features, wherein the identified data files having the association with the social community are classified within a particular node of the hierarchical structure that is defined by the one or more features;
   updating the list of key terms based on an analysis of the identified data files; and
   using the updated list of key terms to identify other data files that have the common characteristic.

2. The method of claim 1, wherein the upper nodes group the data files based on general similarities, and wherein the lower nodes group the data files based on specific similarities.

3. The method of claim 1, further comprising:
   using a decision tree to classify the data files within the hierarchical structure, wherein the decision tree employs a criterion sensitive to a presence or an absence of the key terms in the plurality of data files, and wherein data files grouped within the lower nodes have a greater number of similarities than data files grouped within the upper nodes.

4. The method of claim 1, further comprising:
   building a network including one or more of the plurality of data files, wherein connections between the data files of the network are encoded as links or edges, and wherein the data files are classified within the hierarchical structure by analyzing the network.

5. The method of claim 4, wherein the links or edges are top-down directional links or edges.

6. The method of claim 1, further comprising:
   classifying data files within an upper node of the hierarchical structure based on a physical connection between the classified data files or based on a semantic connection between the classified data files, wherein the physical connection indicates a message exchange between the classified data files, and wherein the semantic connection indicates shared semantic content in the classified data files.

7. The method of claim 6, wherein the data files classified within the upper node are linked together by a thread.

8. The method of claim 7, wherein the thread is defined by email header fields, a common thread field in a database, a common topic on a discussion forum, or a common social media message.

9. The method of claim 6, wherein the data files classified within the upper node originate from a common geographical location, are associated with a common period of time, or are associated by a shared semantic similarity based on patterns of nouns, verbs, other words, or parts of speech.

10. The method of claim 1,
wherein the data file is further classified within a lower node of the hierarchical structure based on a social organization characteristic of the classified data file, an individual descriptive characteristic of the classified data file, or an operational characteristic of the classified data file, wherein the social organization characteristic indicates a social position associated with a creator of the classified data file, wherein the individual descriptive characteristic indicates a personal characteristic of the creator of the classified data file, and wherein the operational characteristic indicates characteristics of message exchange associated with the classified data file.

11. The method of claim 10, further comprising:
classifying the data file within the lower node of the hierarchical structure by classifying the data file based on the individual descriptive characteristic first, classifying the data file based on the social organization characteristic second, and classifying the data file based on the operational characteristic third.

12. The method of claim 10, wherein the individual descriptive characteristic includes age, gender, education, marital status, interests, affiliations, or memberships of the creator of the classified data file.

13. The method of claim 1, wherein the psychological characteristic includes mood state of the creator of the classified data file or an introversion or extroversion score of the creator of the classified data file.

14. The method of claim 10, wherein the social organization characteristic includes a geographical location associated with the classified data file; a time associated with the classified data file; a social role associated with the classified data file; an indication of whether the creator of the classified data file has a leader status, a follower status, or a marginal status; a social influence associated with the classified data file; a community size associated with the classified data file; a community density associated with the classified data file; a dispersion of a community associated with the classified data file; or a community character associated with the classified data file.

15. The method of claim 10, wherein the operational characteristic includes a message recency of the classified data file, a frequency of message exchange over a given time period between the data files classified within the lower node, a message mood state, a conversation acceleration rate of the data files classified within the lower node, or a characterization of the message exchange between the data files classified within the lower node as being personal or professional.

16. The method of claim 10, further comprising:
classifying the data file within the lower node of the hierarchical structure by classifying the data file based on the individual descriptive characteristic first, classifying the data file based on the operational characteristic second, and classifying the data file based on the social organization characteristic third.

17. The method of claim 10, further comprising:
classifying the data file within the lower node of the hierarchical structure by classifying the data file based on the social organization characteristic first, classifying the data file based on the individual descriptive characteristic second, and classifying the data file based on the operational characteristic third.

18. The method of claim 10, further comprising:
classifying the data file within the lower node of the hierarchical structure by classifying the data file based on the social organization characteristic first, classifying the data file based on the operational characteristic second, and classifying the data file based on the individual descriptive characteristic third.

19. The method of claim 10, further comprising:
classifying the data file within the lower node of the hierarchical structure by classifying the data file based on the operational characteristic first, classifying the data file based on the social organization characteristic second, and classifying the data file based on the individual descriptive characteristic third.

20. The method of claim 10, further comprising:
classifying the data file within the lower node of the hierarchical structure by classifying the data file based on the operational characteristic first, classifying the data file based on the individual descriptive characteristic second, and classifying the data file based on the social organization characteristic third.

21. The method of claim 1, further comprising:
analyzing the data files having the association with the social community, the analyzing including:
extracting features from the data files having the association with the social community;
computing a combination or a permutation of one or more of the extracted features; and
updating the list of key terms based on the extracted features and the combination or the permutation.

22. The method of claim 21,
wherein the extracted features are words, phrases, sentences, or symbols, and wherein the combination or the permutation includes a synonym, a collocation, a sequential collocation, a bigram, a noun phrase, a named entity, a part of speech, or a raw term.

23. The method of claim 21,
wherein the combination or the permutation is a hypernym.

24. The method of claim 1,
wherein the one or more features define the homogenous sub-group of the population from which changes in vocabulary used to describe the common characteristic develop.

25. The method of claim 1, comprising:
receiving the plurality of data files, the plurality of data files including one or more data files that do not have the common characteristic.

26. The method of claim 1, wherein the common characteristic is a category, classification, or topic.

27. The method of claim 1, further comprising:
receiving the plurality of data files, wherein the plurality of data files are text documents; and
generating the list of key terms, the key terms being words, phrases, sentences, or symbols that are associated with the common characteristic.

28. The method of claim 27, further comprising:
using the updated list of key terms to categorize text or to generate search strings for a search engine.

29. The method of claim 23, further comprising:
using the updated list of key terms to perform text categorization, wherein text to be categorized is from a social media source.

30. The method of claim 1, further comprising:
using a human to determine the common characteristic of the one or more data files having the common characteristic and the key terms of the list of key terms.

31. The method of claim 1, further comprising:
using a computer to determine the common characteristic of the one or more data files having the common characteristic and the key terms of the list of key terms.

32. The method of claim 1,
wherein the identified data files are created by members of the social community, and wherein a social context of the social community influences a meaning of vocabulary in the identified data files.

33. The method of claim 1,
wherein the list is a topic definition, and wherein the key terms of the topic definition are associated with the common characteristic.

34. A system for identifying data files that have a common characteristic, the system comprising:
one or more processors; and
one or more non-transitory computer-readable storage mediums containing instructions configured to cause the one or more processors to perform operations including:
receiving a plurality of data files including one or more data files having the common characteristic;
generating a list of key terms from the plurality of data files;
classifying each data file of the plurality of data files within a hierarchical structure, the hierarchical structure including upper nodes and lower nodes configured to group data files having similar characteristics, wherein a data file is classified within a lower node of the hierarchical structure based on a psychological characteristic of the classified data file, wherein the psychological characteristic indicates a psychological state of the creator of the classified data file;
identifying data files from the plurality of data files having an association with a social community, the social community being a homogenous sub-group of a larger population defined by one or more features, wherein the identified data files having the association with the social community are classified within a particular node of the hierarchical structure that is defined by the one or more features;
updating the list of key terms based on an analysis of the identified data files; and
using the updated list of key terms to identify other data files that have the common characteristic.

35. A computer program product for identifying data files that have a common characteristic, tangibly embodied in a machine-readable non-transitory storage medium, including instructions configured to cause a data processing system to:
receive a plurality of data files including one or more data files having the common characteristic;
generate a list of key terms from the plurality of data files;
classify each data file of the plurality of data files within a hierarchical structure, the hierarchical structure including upper nodes and lower nodes configured to group data files having similar characteristics, wherein a data file is classified within a lower node of the hierarchical structure based on a psychological characteristic of the classified data file, wherein the psychological characteristic indicates a psychological state of the creator of the classified data file;
identify data files from the plurality of data files having an association with a social community, the social community being a homogenous sub-group of a larger population defined by one or more features, wherein the identified data files having the association with the social community are classified within a particular node of the hierarchical structure that is defined by the one or more features;
update the list of key terms based on an analysis of the identified data files; and
use the updated list of key terms to identify other data files that have the common characteristic.

36. A system for generating a list of key terms from a plurality of data files, the system comprising:
a processor; and
a non-transitory computer-readable storage medium containing instructions configured to cause the processor to perform operations including:
receiving a plurality of data files including one or more data files having a common characteristic, the common characteristic comprising a subject matter or a topic;
generating a list of key terms from the received plurality of data files;
classifying each data file of the received plurality of data files within a hierarchical structure, the hierarchical structure including nodes configured to group data files having similar features, wherein a data file is classified within a node of the hierarchical structure based on a psychological characteristic of the classified data file, wherein the psychological characteristic indicates a psychological state of the creator of the classified data file;
identifying a group of data files having an association with the node of the hierarchical structure, the node being associated with a social community, the social community being a homogenous sub-group of a larger population;
extracting features from the identified group of data files, the features including words related to the common characteristic; and
updating the generated list of key terms based on the extracted features.

37. The system of claim 36, wherein the plurality of data files further includes one or more data files not having the common characteristic, and wherein the list of key terms generated from the plurality of data files includes a ranking or weighting value associated with each term of the list.

38. A system for generating a list of key terms from a plurality of data files, the system comprising:
a processor; and
a non-transitory computer-readable storage medium containing instructions configured to cause the processor to perform operations including:
receiving the plurality of data files from a text corpus;
calculating categories or topics from the received plurality of data files;
extracting the list of key terms from the received plurality of data files based on the calculated categories or topics;
classifying the received plurality of data files within a hierarchical structure, the hierarchical structure including nodes configured to group data files having similar features that define a homogenous sub-group of a larger population, wherein a data file is classified within a node of the hierarchical structure based on a psychological characteristic of the classified data file, wherein the psychological characteristic indicates a psychological state of the creator of the classified data file;
identifying a group of data files having an association with the node of the hierarchical structure;
extracting features from the identified group of data files, the features including words related to one or more of the calculated categories or topics;
computing combinations or permutations of the extracted features; and using the extracted features and the combinations or permutations to update the list of key terms.

39. The system of claim 38, wherein the processor is further configured to execute operations including:
building the hierarchical structure using a decision tree.

40. The system of claim 39, wherein the processor is further configured to execute operations to classify the plurality of data files within the hierarchical structure using the decision tree, wherein the decision tree employs a criterion sensitive to an absence of the key terms in the plurality of data files, and wherein each node of the hierarchical structure is associated with the homogenous sub-group.

41. The system of claim 39, wherein the processor is further configured to execute operations to classify the plurality of data files within the hierarchical structure using the decision tree, wherein the decision tree employs a criterion sensitive to a presence of the key terms in the plurality of data files, and wherein each node of the hierarchical structure is associated with the homogenous sub-group.

* * * * *